(12) United States Patent
Schnellbaecher

(10) Patent No.: US 8,549,157 B2
(45) Date of Patent: Oct. 1, 2013

(54) TRANSPARENT SECURE SOCKET LAYER

(75) Inventor: Jan F. Schnellbaecher, Paderborn (DE)

(73) Assignee: McAfee, Inc., Santa Clara, CA (US)

( * ) Notice: Subject to any disclaimer, the term of this patent is extended or adjusted under 35 U.S.C. 154(b) by 502 days.

(21) Appl. No.: 11/738,834

(22) Filed: Apr. 23, 2007

(65) Prior Publication Data

US 2008/0263215 A1   Oct. 23, 2008

(51) Int. Cl.
*G06F 15/16*   (2006.01)

(52) U.S. Cl.
USPC ............................. 709/229; 726/9; 713/151

(58) Field of Classification Search
USPC .......................................................... 709/229
See application file for complete search history.

(56) References Cited

U.S. PATENT DOCUMENTS

| | | | |
|---|---|---|---|
| 6,367,009 B1* | 4/2002 | Davis et al. ................... | 713/166 |
| 7,149,892 B2* | 12/2006 | Freed et al. ................... | 713/151 |
| 7,702,901 B2* | 4/2010 | Ferguson ...................... | 713/153 |
| 7,954,144 B1* | 5/2011 | Ebrahimi et al. .............. | 726/12 |
| 2002/0152382 A1* | 10/2002 | Xiao ............................. | 713/173 |
| 2003/0014628 A1* | 1/2003 | Freed et al. ................... | 713/155 |
| 2003/0131259 A1 | 7/2003 | Barton et al. | |
| 2004/0015725 A1* | 1/2004 | Boneh et al. .................. | 713/201 |
| 2004/0068665 A1* | 4/2004 | Fox et al. ...................... | 713/201 |
| 2005/0169285 A1* | 8/2005 | Wills et al. .................... | 370/401 |
| 2005/0177866 A1* | 8/2005 | Kirsch ............................. | 726/3 |
| 2005/0204050 A1* | 9/2005 | Turley et al. .................. | 709/229 |
| 2006/0031354 A1* | 2/2006 | Patrick et al. ................. | 709/206 |
| 2006/0031492 A1* | 2/2006 | Thayer et al. ................. | 709/225 |
| 2006/0233166 A1* | 10/2006 | Bou-Diab et al. ............ | 370/389 |
| 2006/0282883 A1* | 12/2006 | Rosenberg et al. ............. | 726/4 |
| 2007/0177731 A1* | 8/2007 | Spies et al. .................... | 380/47 |
| 2007/0180510 A1* | 8/2007 | Long et al. .................... | 726/10 |
| 2007/0204341 A1* | 8/2007 | Rand et al. .................... | 726/22 |
| 2008/0022084 A1* | 1/2008 | Raftelis et al. ................ | 713/153 |
| 2008/0046717 A1* | 2/2008 | Kanekar et al. ............... | 713/156 |
| 2008/0072311 A1* | 3/2008 | Mullick et al. ................. | 726/15 |
| 2008/0126794 A1* | 5/2008 | Wang et al. ................... | 713/151 |
| 2008/0201575 A1* | 8/2008 | van der Rijn ................. | 713/156 |
| 2008/0235508 A1* | 9/2008 | Ran et al. ...................... | 713/151 |
| 2009/0013399 A1* | 1/2009 | Cottrell et al. ................ | 726/12 |
| 2010/0186076 A1* | 7/2010 | Ali et al. .......................... | 726/9 |

FOREIGN PATENT DOCUMENTS

| | | |
|---|---|---|
| EP | 1667398 A1 | 6/2006 |
| WO | WO-2005/060202 A1 | 6/2005 |

OTHER PUBLICATIONS

Author Paul Querna, Paul's Journal, "TLS Server Name Indication." Published on Apr. 24, 2005.*
"European Application Serial No. 08155000.6, Search Report Mailed Sep. 9, 2008", 6 pgs.

(Continued)

*Primary Examiner* — Hamza Algibhah
(74) *Attorney, Agent, or Firm* — Wong, Cabello, Lutsch, Rutherford & Brucculeri, LLP

(57) ABSTRACT

Various systems, apparatus, and methods include an apparatus comprising a transparent proxy coupled to a plurality of non-configured clients and coupled to one or more servers, the transparent proxy operable to intercept a request for a secured connection to a first server of the one or more servers, the request from a first non-configured client of the plurality of non-configured clients and including a server name indication extension, and to supply a proper certificate to the first non-configured client including the server name indication extension as a common name in the proper certificate.

14 Claims, 5 Drawing Sheets

(56) References Cited

OTHER PUBLICATIONS

Vesperman, Jennifer, "Transparent Proxying with Squid", http://www.linuxdevcenter.com/pub/a/linux/2001/10/25/transparent_proxy.html, LinuxDevCenter.com,(Oct. 25, 2001),5 pages.

"European Application Serial No. 081550006, Office Action mailed May 27, 2009", 1 Page.

European Application Serial No. 08155000.6, Office Action mailed Dec. 10, 2010, 7 pgs.

European Application Serial No. 08155000.6, Response filed Dec. 7, 2009 to Office Action mailed May 27, 2009, 18 pgs.

* cited by examiner

TRANSPARENT SECURE SOCKET LAYER

FIELD OF THE INVENTION

The present invention is related to computer network security, and more particularly, to establishing and scanning secured network connections.

BACKGROUND INFORMATION

In modern computer networks multiple clients are networked together to allow the networked clients to share one or more resources coupled to the network. Resources may be servers, files, WebPages, or may simply include responses to requests made by a client. For example, the multiple computers may be clients that are coupled through a network to one or more printers (one type of resource) that the computers may access in order to print out paper documents. In various arrangements, a server may provide computer services that allows the multiple clients to make connections to these shared resources. In addition, servers, referred to as proxy servers, may allow the multiple clients to make network connections to other computers or to other servers over a network such as the Internet.

It may be desirable in some arrangements to have all requests for resources available through the network to be controlled based on security or usage policies determined for the clients, either on an individual basis, or as a group, or both. In some instances, the policies may limit the access a client is allowed to have with respect to one or more particular resources. In some instances, a group of clients may have a security policy that prevents the clients from accessing resources outside a particular network of resources. For example, a group of clients may be allowed only to access resources on a local network, and may be blocked from accessing resources external to the local network.

In other instances, it may be desirable to allow a client or a group of clients to have access to one or more resources provided over the Internet, but the types of resources that can be accessed may be screened or limited by the security and usage policies. For example, a school having student work stations coupled to the Internet may want to allow students using the work stations to have access to web sites determined to be educational, but may also want to screen for and block requests made by a student for a resource or web site on the Internet that may be deemed inappropriate by the security and usage policies applied to the work stations. In addition, other work stations, for example work stations used by teachers or school administrators, may also be coupled to the Internet but may have a different set of security and usage policies applied to these work stations.

In general, in order to enforce the security or usage policies, requests from each client to be regulated are directed to a proxy server that is capable of providing scanning and control of the requests based on the applicable security and usage policies for the requesting client. The proxy server will scan each of the client requests and determine for each request if the requesting client is to be granted access to the requested resource based on the secure and usage policies. If access is allowed, the proxy server will allow the connection to occur, or if the access is not allowed, the proxy server can block the access by denying the request for the resource.

The use of a proxy server has the disadvantage that each client must be configured to address all requests for resources to the proxy server. As new clients are added, the new clients must be configured to direct all requests from the new client to the proxy server, adding to the setup complexity and cost of adding new clients. In addition, a client may attempt to bypass the proxy server by addressing requests directly to a resource rather than to the proxy server. In some instances, these requests may be addressed to resources that violate the security and usage policies for the client making the request.

DETAILED DESCRIPTION OF THE INVENTION

In the following detailed description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Embodiments include apparatus, methods and systems to intercept and scan encrypted requests for resources without the necessity to configure clients to use a particular software and a particular proxy server. In previous applications, in order to implement security and usage policies for one or more clients, the software must be deployed as a proxy, and each client must be configured to use the protocol and software of the proxy.

Embodiments are described herein that allow the interception and scanning of client requests between a non-configured client and another resource, to apply the security and usage policies to these client requests, and to establish authenticated and secure connections between the requesting non-configured client and the resource only if the connection does not violate any of the security and usage policies applicable for the non-configured client making the request. A non-configured client refers to a client that is not configured to have requests for resources directed to a pre-determined proxy server, and does not necessarily have to make requests for resources using a particular software format of a proxy server.

Thus, new clients can be added to a network without the need to configure each new client to direct requests to a pre-determined proxy server, while allowing the new clients, and any existing clients, to make requests for resources and have these requests scanned and controlled by a set of security and usage policies. In addition, embodiments described herein allow a client to request a secure session with a resource and to receive a proper certificate in response to the initial request regardless of whether the request does or does not violate the security and usage policies for the requesting client.

Figure 1:
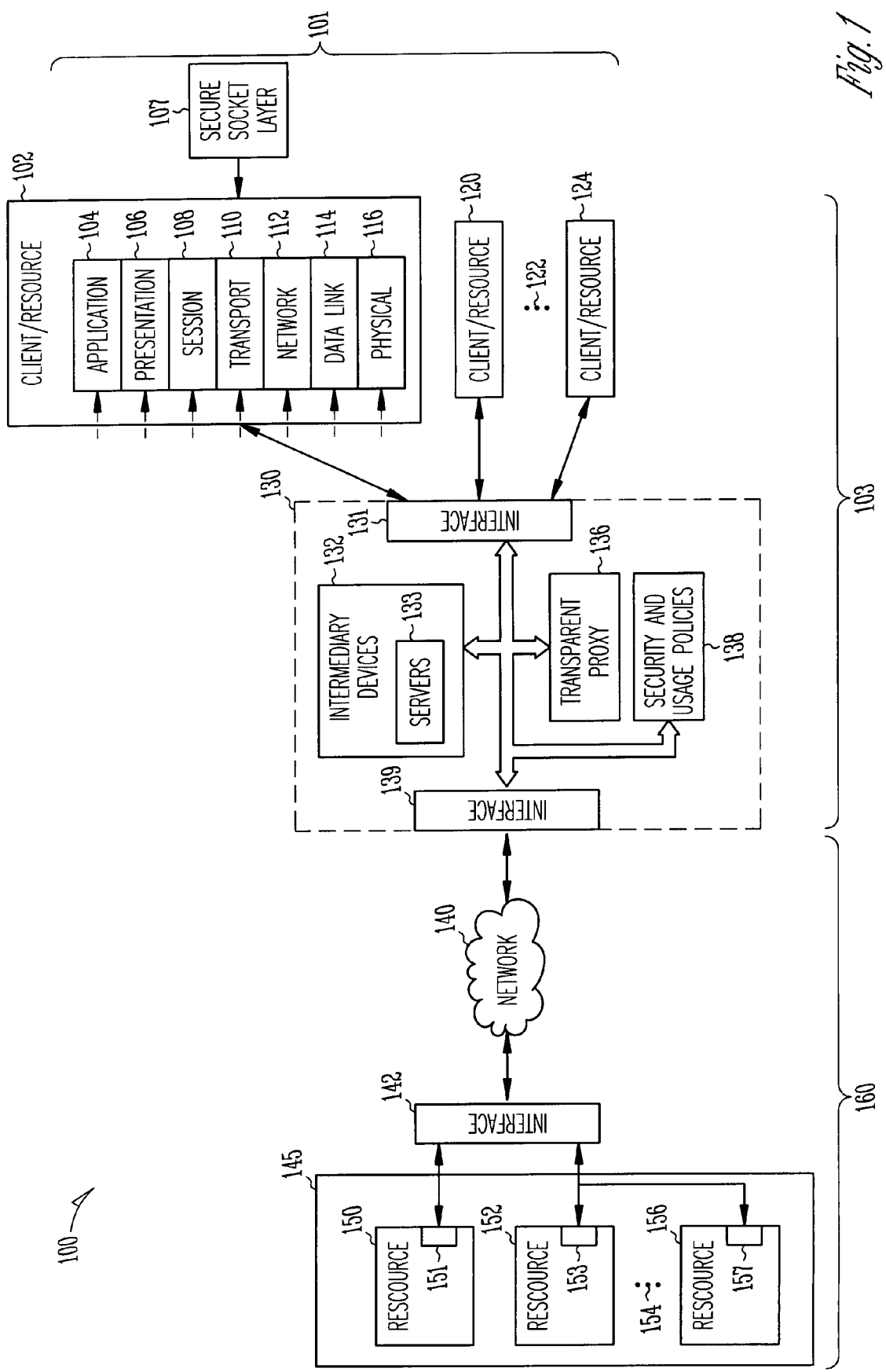
FIG. 1 illustrates a system including a transparent proxy according to various embodiments.

FIG. 1 illustrates a system 100 including a transparent proxy 136. In various embodiment, system 100 includes a network 103 including a plurality of clients 101 coupled to a gateway 130. The plurality of clients 101 are not limited to any particular type of client, and may including any device or software application coupled to network 103. The plurality of clients 101 is not limited to a particular number of clients, and may include any number of clients as indicted by clients 102, 120, and 124, and the dotted line 122 between clients 120 and 124. In various embodiments, clients 101 includes different types of clients, including hardware devices such as computers, and software applications, all connected to network 103.

Gateway 130 is not limited to any particular type of gateway. In various embodiments, gateway 130 includes interface 131 to couple gateway 130 to the plurality of clients 101. In various embodiments, gateway 130 includes interface 139 to couple gateway 130 to network 140. Interfaces 131 and 139 are not limited to any particular types of interfaces, or to the using the same types of interfaces, and may include any interfaces appropriate to couple gateway 130 to the plurality of clients 101 and to network 140.

In various embodiments, resources 145 are coupled to network 103 through interface 142 and network 140. In various embodiments, network 140 is the Internet. However, network 140 is not limited to a particular network, and may include any network capable of coupling resources 145 to network 103. In various embodiments, one or more of resources 145 may be directly coupled to network 140. In various embodiments, one or more of resources 145 includes an interface such as interface 151, 153, and 157 operable to couple the associated resource to network 140. By way of illustration, in various embodiments, resource 150 includes interface 151 operable to couple resource 150 to network 140. In various embodiments, resource 152 includes interface 153 operable to couple resource 152 to network 140. In various embodiments, resource 156 includes interface 157 operable to couple resource 156 to network 140.

In various embodiments, gateway 130 includes transparent proxy 136. In various embodiments, transparent proxy 136 is coupled to interface 131. In various embodiments, transparent proxy 136 is coupled to interface 139. In various embodiments, transparent proxy 136 is coupled to intermediary devices 132. Intermediary device 132 are not limited to any particular devices, and may include hardware devices, such as but not limited to routers and switches, for coupling devices, such as clients 101 and resources 145, in system 100.

In various embodiments, intermediary devices 132 include one or more servers 133. Servers 133 are not limited to any particular number of servers, and may include one or a plurality of servers. Servers 133 are not limited to any particular type of servers, and may include any server or servers that are operable to receive requests for resources from clients 101 and provide, if allowed, the requested resource to the requesting client.

In various embodiments, transparent proxy 136 comprises instructions that may be stored as one or more software programs on one or more of servers 133.

In various embodiments, gateway 130 includes security and usage policies 138 coupled to transparent proxy 136. In various embodiments, security and usage policies 138 includes stored set of rules for security and usage policies applicable to clients 101. Security and usage policies 138 are not limited to any particular type of policies, and may include any rules or policies for security and usage determined to be appropriate for clients 101, either individually, as a group, or both individually and as one or more groups. In various embodiments, security and usage policies 138 includes one or more policies applicable to all of clients 101.

In various embodiments, one of clients 101 initiates a request for a resource over a secure connection by requesting a Transmission Control Protocol (TCP) connection to a particular resource, which is intercepted by a transparent proxy 136 coupled to the requesting client. In some embodiments, resources to be accessed by clients are identified using Uniform Resource Identifiers (URIs) (or, more specifically, URLs) using the http: or https URI schemes.

In various embodiments, a client requests a secure connection over the TCP connection based on a Transport Layer Security or Secure Sockets Layer protocol. Transport Layer Security (TLS) and its predecessor, Secure Sockets Layer (SSL), are cryptographic protocols which provide secure communications on the Internet for such things as web browsing, e-mail, Internet faxing, instant messaging and other data transfers. There are slight differences between SSL 3.0 and TLS 1.0, but the protocol remains substantially the same.

In various embodiments, any secure connections established includes Hypertext Transfer Protocol (HTTP) with SSL or TLS as secure HTTPS. Hypertext Transfer Protocol (HTTP) is a method used to transfer or convey information on the World Wide Web. HTTPS is a URI scheme used to indicate a secure HTTP connection. It is syntactically identical to the http:// scheme normally used for accessing resources using HTTP. Using an https: URL indicates that HTTP is to be used, but with a different default TCP port (443) and an additional encryption/authentication layer between the HTTP and TCP.

In various embodiments, IM (AOL) plus SSL or TLS is used to create secure connections. In various embodiments, Post Office Protocol version 3 (POP3) plus SSL or TLS is use to create secure connections based on secure SPOP3. In various embodiments, Internet Message Access Protocol (IMAP) plus SSL or TLS is used to create and secure connections based on secure IMAP. Embodiments including secure connections are not limited to any particular protocols for use by clients 101 to communicate using a secure connections. Any protocol having a SSL or a TLS protocol on top may be used by clients 101 in the embodiments described herein.

The TLS protocol(s) allow applications to communicate across a network in a way designed to prevent eavesdropping, tampering, and message forgery. TLS provides endpoint authentication and communications privacy over the Internet using cryptography. Typically, only the server is authenticated (i.e., its identity is ensured) while the client remains unauthenticated; this means that the end user (be that a person, or an application such as a web browser), can be sure with whom they are "talking". The next level of security—in which both ends of the "conversation" are sure with whom they are "talking"—is known as mutual authentication. Mutual authentication requires public key infrastructure (PKI) deployment to clients.

In cryptography, a public key certificate (or identity certificate) is a certificate which uses a digital signature to bind together a public key with an identity—information such as the name of a person or an organization, their address, and so forth. The certificate can be used to verify that a public key belongs to an individual.

In cryptography, a certificate authority or certification authority (CA) is an entity which issues digital certificates for use by other parties. It is an example of a trusted third party. CAs are characteristic of many public key infrastructure (PKI) schemes.

In various embodiments, transparent proxy 136 is a intercepting proxy operable to intercept one or more of the requests received at gateway 130 from one or more of clients 101. In various embodiments, transparent proxy 136 is a transparent proxy in that clients 101 are not aware that any requests for resources issued by clients 101 are being intercepted and processed by transparent proxy 136. Clients 101 are non-configured clients in that clients 101 do not need to be configured to direct requests to a pre-determined proxy, since transparent proxy 136 is operable to intercept the requests from clients, and to establish secure connections between any of clients 101 and another resource, without clients 101 knowing anything about transparent proxy 136, or even knowing that transparent proxy 136 is intercepting requests and establishing secure connections based on the requests.

In various embodiments, clients 101 include one or more clients capable of requesting a resources from one or more other clients coupled network 103. In various embodiments, clients 101 are capable of requesting resources 145 that are included in an external network 160 coupled to network 103. In various embodiments, external network 160 includes resources 145. Resources 145 may include any number of resources, such as resources 150, 152, and 156, and additional resources indicted by dotted line 154 between resource 152 and resource 156.

In operation, a non-configured client 101 makes a request for a resource. In various embodiments, one or more of clients 101, such as client 102, may include operating layers, such as application layer 104, presentation layer 106, session layer 108, transport layer 110, network layer 112, data link layer 114, and physical layer 116. These layer may be used by a client 101 having these layer to communicating on network 103. In various embodiments, one or more of clients 101 may include a secure sockets layer 107, as illustrated for client 102. Secure sockets layer 107 is used by client 102 to initiate and establish secure connections on network 103, and authenticated and secure connections that may extent through gateway 130 to requested resources 145 beyond network 103. The requested resource may be any one of clients 120, 122 (as represented by the dotted line), or 124, or may be one of the resources 145 located in network 160.

In various embodiments, the request is received at gateway 130 and is intercepted by transparent proxy 136. Transparent proxy 136 is operable to determine, based on security and usage policies 138, whether the resource being requested by the non-configured client 101 violates the security and usage policies 138 for the non-configured client 101. If the request violates the security and usage policies 138 for the non-configured client 101, transparent proxy 136 blocks access to the requested resource, and responds to non-configured client 101 that access has been denied. If the request does not violate the security and usage policies 138 for the non-configured client 101, transparent proxy 136 will proceed to establish a secure connection between non-configured client 101 and the transparent proxy 136, and between the transparent proxy 136 and the requested resource, so that data transfer between the non-configured client 101 and the requested resource can take place over two different and independent secured connections.

Regardless of whether a request intercepted by the transparent proxy 136 violates or does not violate the security and usage policies 138 for the non-configured client 101, transparent proxy 136 is operable to supply a proper certificate to the non-configured client 101 in response to the request. Supplying a proper certificate, as further described herein, allows the transparent proxy 136 to respond to the request without causing the non-configured client 101 to generate a certificate verification error because of a common name mismatch.

Figure 2:
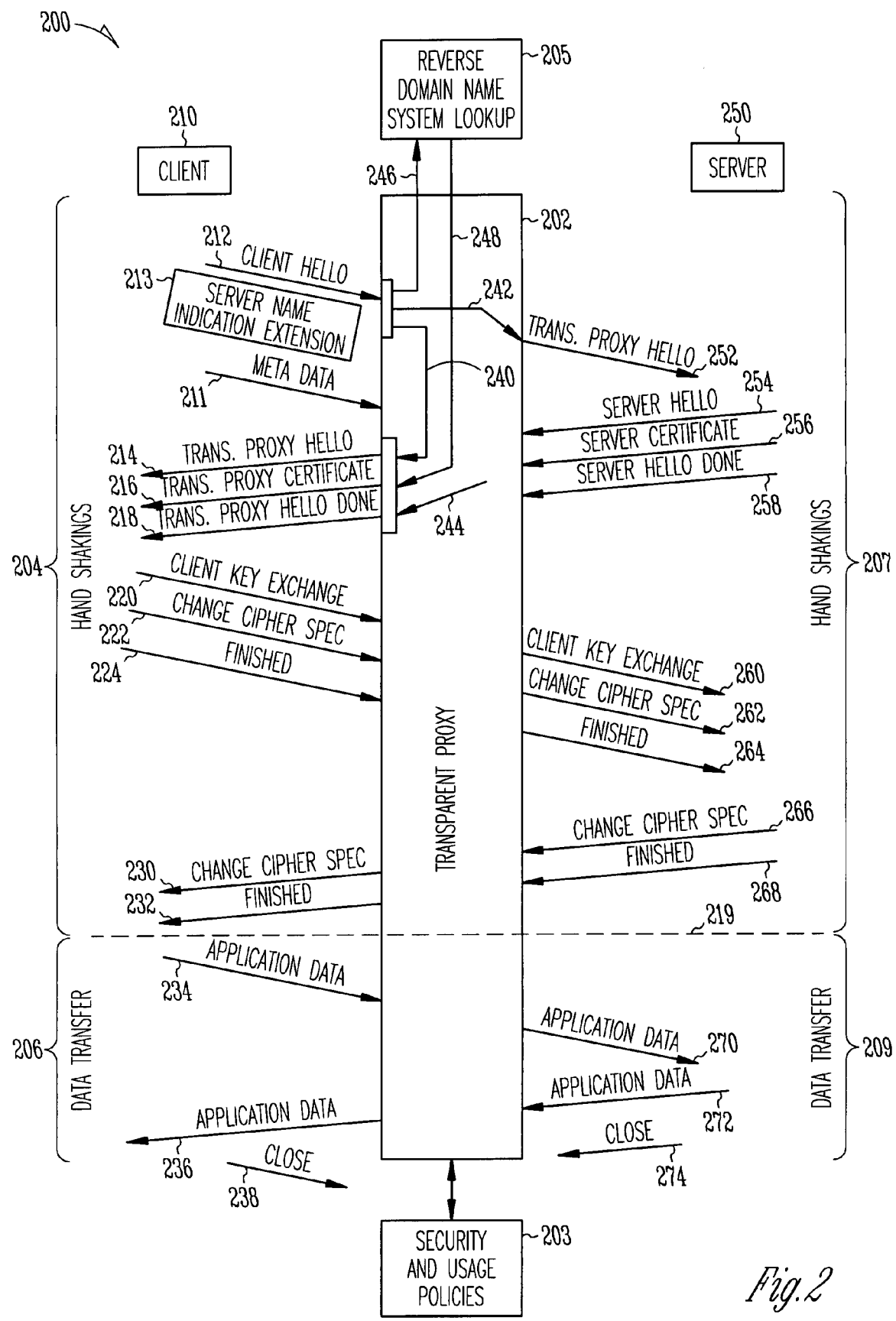
FIG. 2 illustrates a diagram including SSL handshaking messages.

FIG. 2 illustrates handshaking data diagram 200. Diagram 200 includes a transparent proxy 202, a client 210, and a server 250. Transparent proxy 202 is coupled to security and usage policies 203. Transparent proxy 202 is not limited to any particular type of proxy, and includes any type of proxy that is operable to provide the handshaking and the data transfer as shown in diagram 200, and is operable to apply the security and usage policies 203 applicable to the client 210. In various embodiments, transparent proxy 210 is the transparent proxy 136 as shown in FIG. 1. Security and usage policies 203 is not limited to any particularly set of security and usage policies. In various embodiments, the security and usage policies 203 to be applied by transparent proxy 202 as shown in FIG. 2 are the security and usage policies 138 as shown in FIG. 1.

Returning to FIG. 2, in various embodiments a SSL handshake 204 is exchanged between the client 210 and the transparent proxy 202. In various embodiments, SSL handshake 207 is exchanged between transparent proxy 202 and server 250. In various embodiments, the client 210 requests access to server 250 by providing ClientHello 212 request. The ClientHello 212 request is intercepted by transparent proxy 202. In various embodiment, ClientHello 212 request includes a request to make a secure connection to server 250. In various embodiments, meta data 211 will also be forwarded from client 210 and intercepted by transparent proxy 202. In various embodiments, the meta data includes a destination IP address of the server or the resource provide by server 250 that client 210 is requesting access to.

After intercepting ClientHello 212 from client 210, and meta data 211 if provided, transparent proxy 202 may determine, based on security and usage policies 203, whether this access violates any of the security and usage policies 203 for client 210. If this access does not violate the security and usage policies 203, SSL handshaking 204 will proceed so that a secure connection (not shown in FIG. 2) will be established between the client 210 and the transparent proxy 202, and SSL handshaking 207 will proceed so that a separate secure connection (not shown in FIG. 2) will be established between the transparent proxy 202 and the server 250. Once the SSL handshaking 204 and the SSL handshaking 207 are completed, these secure connections will allow data transfer 206 and data transfer 209 to occur between the client 210 and server 250 through transparent proxy 202 over the two separate secure connections.

However, if client 210 requests access to server 250 and this access violates the security and usage policies 203 for client 210, access to the server 250 will be blocked by transparent proxy 202. In various embodiments, the transparent proxy 202 may continue the SSL handshaking 204. However, transparent proxy 202 in various embodiments will discontinue SSL handshaking message 207 between transparent proxy 202 and server 250. In various embodiments, at line 219 SSL handshaking 204 is completed, and transparent proxy 202 returns to client 210 a message indicating that the access to server 250 violates the security and usage policies 203, and therefore access is denied.

Because the client 210 is addressing the server, it is not configured to route requests to the transparent proxy 202, and is unaware that transparent proxy 202 has intercepted the ClientHello 212 request and has intercepted the meta data 211 is provided. Client 210 therefore expects to receive in response to the ClientHello 212 request certain information, including a server certificate including the common name provided a part of the subject information, as associated with server 250. The common name provide to the client 210 must match the name client 210 associates with server 250, or a mismatch error condition will be generated by client 210.

In order to establish this communication with the client 210 and not generate a mismatch error at the client 210, the transparent proxy 202 will need to return to client 210 a transparent proxy hello 214, and transparent proxy certificate 216. These two parts of SSL handshakes 204 are generally followed by a transparent proxy HelloDone 218 handshake message.

If an improper certificate is returned to client 210, a mismatch error, such as a certificate verification error, will be generated by the client 210 indicating that an improper certificate was received. In order to avoid the generation of this mismatch error, the transparent proxy 202 will return to client 210 a proper certificate based on the client 210 request. A proper certificate is a certificate returned to a client based on a client's request for access to a server that does not cause the client to generate a mismatch error fault. To verify that the certificate is a proper certificate, the client will check at least the following in the certificate supplied to the client in response to a request for access to a resource using a secure connection:

1. a check to see that the certificate is not expired;
2. a check to see that the certificate was issued and signed by a third party, such as a Certificate Authority (CA), that the client knows and trusts; and
3. a check to see that the certificate belongs to the resource that was requested.

In checking to see that the certificate belongs to the resource that was requested, the client will compare the common name received in the certificate to the common name expected for the server of the requested resource. The common name is the common name associated with a server providing the requested resource. If the certificate passes all three checks, a proper certificate has been provided to the client. However, based on the initial request from client 210, the common name of the server is not known to the transparent proxy 202. The common name is generally supplied as part of the subject information included in the server certificate 256.

In various embodiments, ClientHello message 212 includes a pre-defined transport layer extension, specifically a "server name indication" extension 213. In embodiments that include server name indication extension 213, transparent proxy 202 will extract the server name indication extension, and provide the extracted server name indication extension as the common name in the certificate returned to the client 210, as represented by arrow 240. Client 210 will recognize the extracted server name indication extension as a proper common name as provided to client 210 in the certificate, and so will not generate a mismatch error in response to transparent proxy certificate 216 having included the extracted server name indication extension as the common name in the transparent proxy certificate 216 SSL handshake message. The inclusion of the server name indication extension can be used even in instances were the transparent proxy 202 determines that the ClientHello 212 request violates the security and usage policy 203 for client 210, and the transparent proxy 202 does not proceed to establish any connections with server 250.

In various embodiments, ClientHello message 212 will not include server name indication extension 213. In such instances, transparent proxy 202 is still able to supply a proper certificate as part of transparent proxy certificate 216, regardless of the fact that the request does not include the server name indication extension, and regardless of whether the request violates or does not violate the security and usage policies 203.

In various embodiments, where the ClientHello message 212 does not include a server name indication extension, but the meta data 211 includes an IP address of the server 250 that client 210 is seeking secured access to, transparent proxy 202 intercepts the ClientHello message 212 and the meta data 211, and determines that a server name indication extension has not been included in the message. Using the IP address that is part of the forwarded meta data 211, transparent proxy 202 establishes a connection to server 250 by issuing a transparent ProxyHello 252 SSL handshake message, as represented by arrow 242. In response, server 250 provides a ServerHello 254, a server certificate 256, and a server HelloDone 258 handshake message. These handshake messages from server 250 are directly send to transparent proxy 202. The server certificate 256 includes subject information including a common name for server 250. Transparent proxy 202 extracts the common name received in the server certificate 256, and includes the common name in the transparent proxy certificate 216, as represented by arrow 244. Client 210 extracts the common name, and because the extracted common name matches the expected common name based on the ClientHello 212 request and the meta data 211, the client does not generate a mismatch error for the common name provided in the transparent proxy certificate 216, as long as the server sends a valid certificate 256. In instances where there in an error in server certificate 256, this error would be copied into transparent proxy certificate 216, and could result in an error being generated at client 210. After delivering the proper certificate, transparent proxy 202 can either continue to establish two separate and secure connections through transparent proxy 202 to couple client 210 and server 250, or deny client 210 access to server 250, based on the security and usage policies 203, as further described herein.

In various embodiments, ClientHello message 212 does not include a server name indication extension, and includes an IP address of the server 250 from the forwarded meta data 211 that client 210 is seeking secured access to, and wherein the IP address includes an address to a resource that is part of a host that includes one or more resources. Transparent proxy 202 intercepts the ClientHello message 212 request and meta data 211, and determines that a server name indication extension has not been included in the message. Using the IP address from the meta data, transparent proxy 202 uses the IP address to perform a reverse domain name system lookup. A reverse domain name system lookup is a process to determine the hostname, which can be used as the common name, associated with an IP address. Transparent proxy 202 provides the IP address to a reverse domain name system lookup 205, as represented by arrow 246. In response, reverse domain name system lookup 205 provides a hostname associated with the IP address to transparent proxy 202, as represented by arrow 248.

Transparent proxy 202 includes the host name as the common name in the transparent proxy certificate 216. Client 210 extracts the common name, and because the extracted common name matches the expected common name based on the ClientHello 212 request and the meta data 211, the client does not generate a mismatch error for the common name provided in the transparent proxy certificate 216. After delivering the proper certificate, transparent proxy 202 can either continue to establish two separate and secure connections through transparent proxy 202 to couple client 210 and server 250, or deny client 210 access to server 250, based on the security and usage policies 203, as further described herein.

In various embodiments, after delivering a proper certificate to client 210, and in instances where the access requested by client 210 violates security and usage policies 203, transparent proxy 202 can indicate to client 210 that access is denied, and thus avoid the additional SSL handshaking 207 required to establish a secure connection between transparent proxy 202 and server 250. In such instances, since access is being denied, no data transfer 206 between client 210 and the transparent proxy 202 will be carried out, and no data transfer 209 between the transparent proxy 202 and server 250 would be allowed that would have resulted based on the request from client 210. In various embodiments, even if access is denied, SSL handshaking 204 will continue until line 219 in order to not generate a SSL handshaking error at client 210 and to send a notification adapted to the underlying protocol about the policy violation.

After delivering a proper certificate to client 210, and in instances where the access being requested does not violate the security and usage policies 203, transparent proxy 202 will continue with SSL handshaking 204 in order to complete a secure connection between the client 210 and the transparent proxy 202, and will initiate or continue with SSL handshaking 207 in order to establish a second secure connection between the transparent proxy 202 and server 250. In various embodiments, in response to the client 210 receiving the transparent proxy certificate 216 and the transparent proxy HelloDone 218 SSL handshake message, the client will issue one or more of the client key exchange 220, change cipher spec 222, and finished 224 SSL handshake messages. These SSL handshake messages will be intercepted by transparent proxy 202, and in response transparent proxy 202 will issue a client key exchange 260, a change cipher spec 262, and a finished 264 SSL handshake message to server 250. In various embodiments, server 250 will respond with change cipher spec 266 and finished 268 SSL handshake messages. These SSL handshake messages will be intercepted by transparent proxy 202, and issued to client 210 as change cipher spec 230 and finished 232 SSL handshake messages.

In various embodiment, the handshaking is completed after the finished 232 handshake is received at client 210. The transparent proxy 202 has established a secure connection between the client 210 and the transparent proxy 202, and a separate secure connection between the transparent proxy 202 and server 250. Once these secure connections are established, data transfer 206 using one or more application data 234 and 236 transfers between the client 210 and the transparent proxy 202, and application data 270 and 272 transfers between the transparent proxy 202 and server 250 can take place. The number of these data transfers is not limited to any particular number of transfers, and may include any number of transfers. In various embodiments, the secure connections are maintained until client 210 issues a close 238 command, at which time the transparent proxy 202 can close the secure connections. In various embodiments, server 250 can also terminate the secure connections, in some embodiments by issuing close SSL handshake message 274.

Since all handshaking and data transfers are intercepted and controlled by transparent proxy 202, transparent proxy 202 is operable to establish a secure connection between a non-configured client and the transparent proxy, and a separate secure connection between the transparent proxy and a server while applying security and usage policies associated with the client to the communications and without generating a mismatch error associated with the certificate at the client.

It would be understood that client 210 and server 250 are illustrative, and could be used to represent any number of clients and any number of servers respectively. In addition, is would be understood that the handshakings 204, and the types of secure connections established by the transparent proxy 202 as shown in diagram 200 are illustrative, and are not limited to any particular set of handshakings or to any particular types of secure connections. The handshakings may include any types of handshakings used to provide secure connections between clients and servers through a transparent proxy, such as but not limited to transparent proxy 202, and while applying security and usage policies associated with the client to the communications and without generating a mismatch error associated with the certificate at the client.

Figure 3:
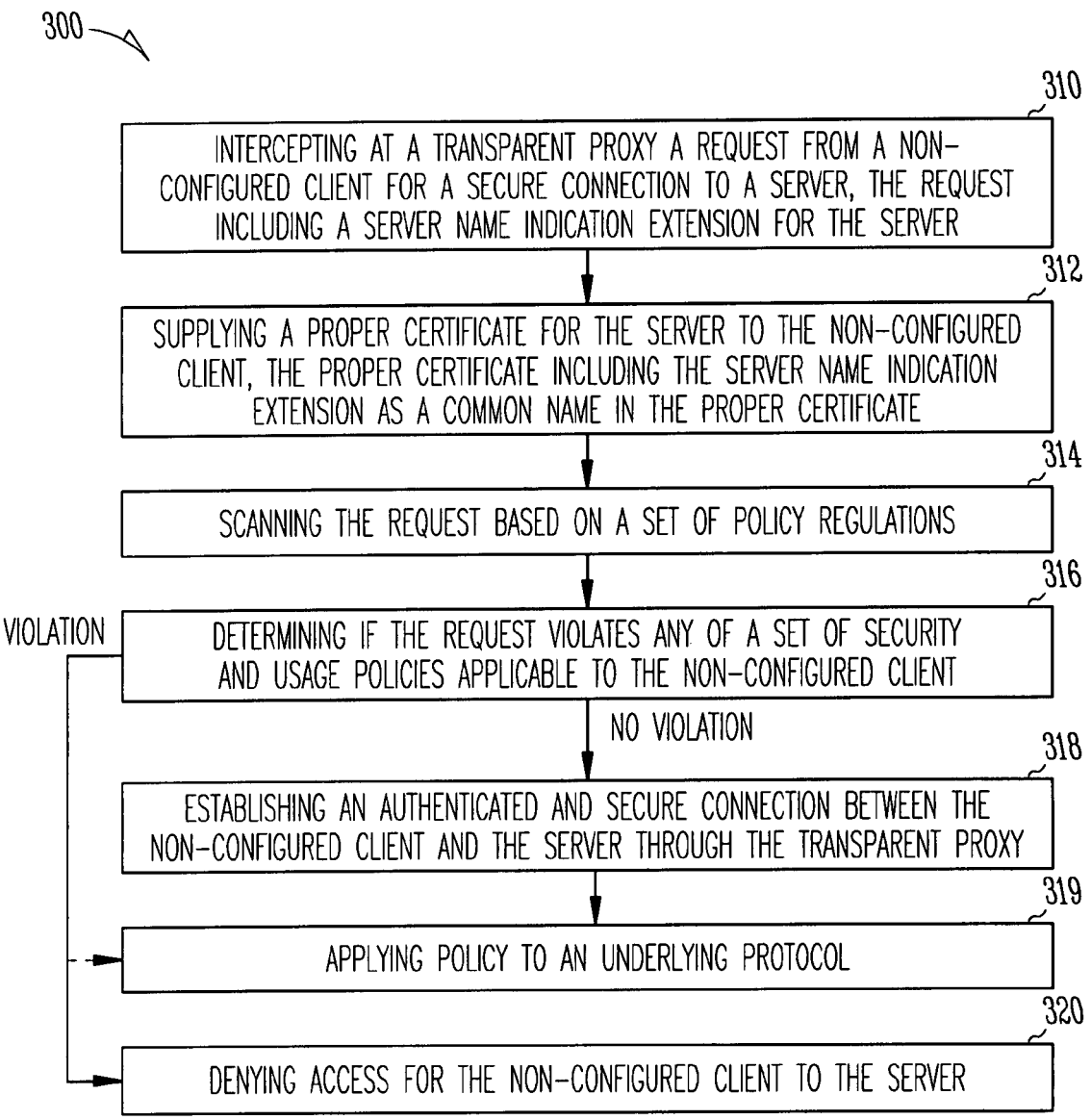
FIG. 3 illustrates a method according to various embodiments.

FIG. 3 illustrates a method 300 according to various embodiments. At block 310 method 300 includes intercepting at a transparent proxy a request from a non-configured client for a secure connection to a server, the request including a server name indication extension for the server.

At block 312 method 300 includes supplying a proper certificate for the server to the non-configured client, the proper certificate including the server name indication extension as a common name in the proper certificate.

At block 314 method 300 includes scanning the request based on a set of policy regulations. At block 316 method 300 includes determining if the request violates any of a set of security and usage policies applicable to the non-configured client.

If no violation exists, method 300 proceeds to block 318, including establishing an authenticated and secure connection between the non-configured client and the server through the transparent proxy. At block 319 method 300 includes applying a policy to an underlying protocol. In various embodiments, applying the policy includes applying a part of the policy to an encapsulated protocol, and applying a different part of the policy to an SSL or TLS connection. In various embodiments, the part of the policy applied to the SSL or TLS connection is used to determine if the encryption is strong enough. In various embodiments, the part of the policy applied to the SSL or TLS connection is used to determine if the server certificate is a trusted and correct certificate. In various embodiments, the part of the policy applied to the encapsulated protocol includes AV scanning and reporting.

If a violation exists, method 300 proceeds to block 320, including denying access for the non-configured client to the server. In various embodiments, denying access includes completing the SSL handshaking messages between the transparent proxy and the client in order to not cause a SSL handshaking message error to be generated at the client and to send a notification adapted to the underlying protocol about the policy violation.

Figure 4:
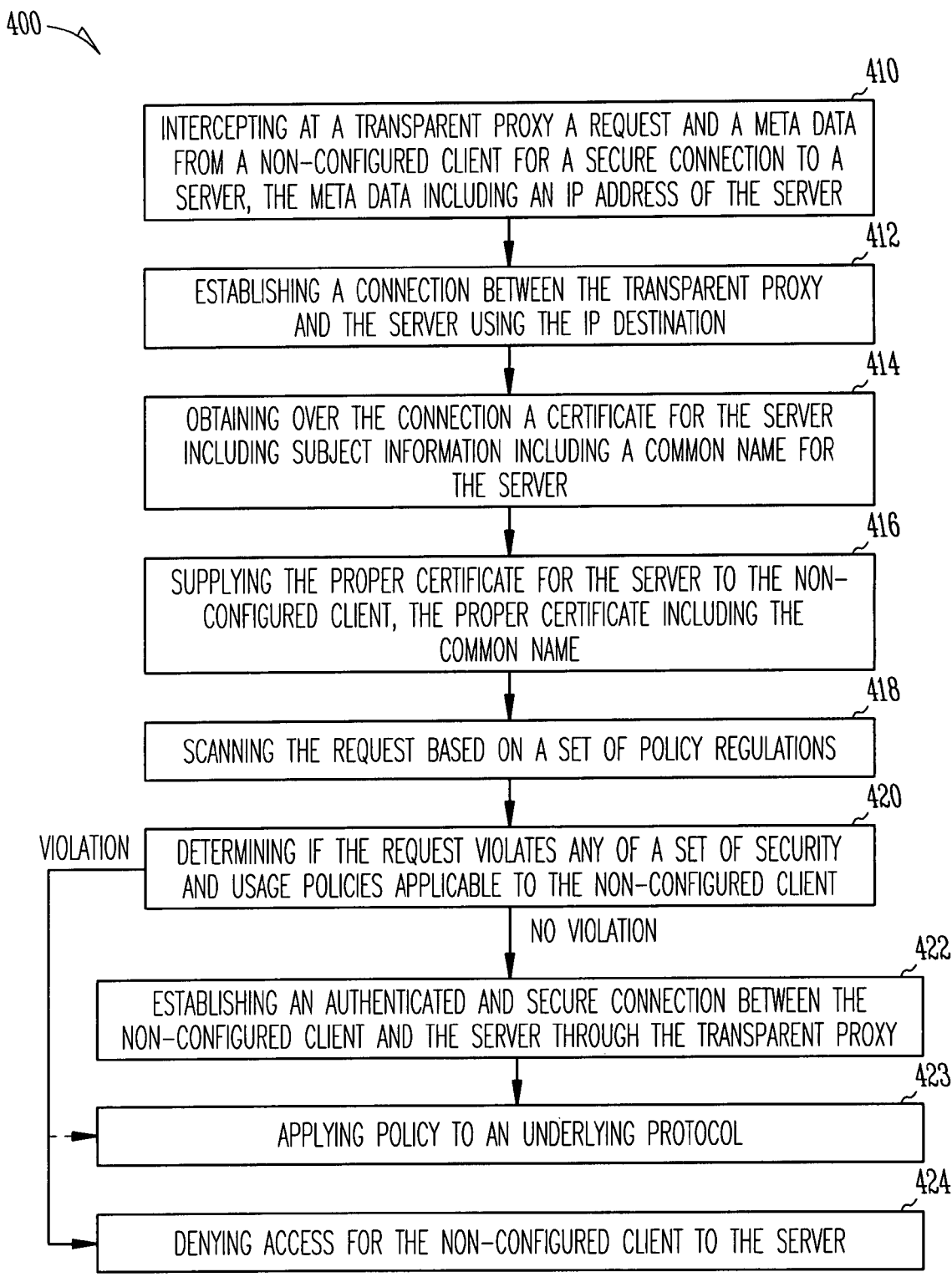
FIG. 4 illustrates a method according to various embodiments.

FIG. 4 illustrates a method 400 according to various embodiments. At block 410 method 400 includes intercepting at a transparent proxy a request and a meta data from a non-configured client for a secure connection to a server, the meta data including an IP address of the server.

At block 412 method 400 includes establishing a connection between the transparent proxy and the server using the IP destination. At block 414 method 400 includes obtaining over the connection a certificate for the server including subject information including a common name for the server. At block 416 method 400 includes supplying the proper certificate for the server to the non-configured client, the proper certificate including the common name. In various embodiments, supplying a proper certificate includes generating a new certificate at the transparent proxy, the new certificate including subject information including a common name copied from the certificate from the server.

At block 418 method 400 includes scanning the request based on a set of policy regulations. At block 420 method 400 includes determining if the request violates any of a set of security and usage policies applicable to the non-configured client.

If no violation exists, method 400 proceeds to block 422, including establishing an authenticated and secure connection between the non-configured client and the server through the transparent proxy. At block 423 method 400 includes applying a policy to an underlying protocol. In various embodiments, applying the policy includes applying a part of the policy to an encapsulated protocol, and applying a different part of the policy to an SSL or TLS connection. In various embodiments, the part of the policy applied to the SSL or TLS connection is used to determine if the encryption is strong enough. In various embodiments, the part of the policy applied to the SSL or TLS connection is used to determine if the server certificate is a authenticated and correct certificate. In various embodiments, the part of the policy applied to the encapsulated protocol includes AV scanning and reporting.

If a violation exists, method 400 proceeds to block 424, including denying access for the non-configured client to the server. In various embodiments, denying access includes completing the SSL handshaking messages between the transparent proxy and the client in order to not cause a SSL handshaking message error to be generated at the client and to send notification adapted to the underlying protocol about the policy violation.

Figure 5:
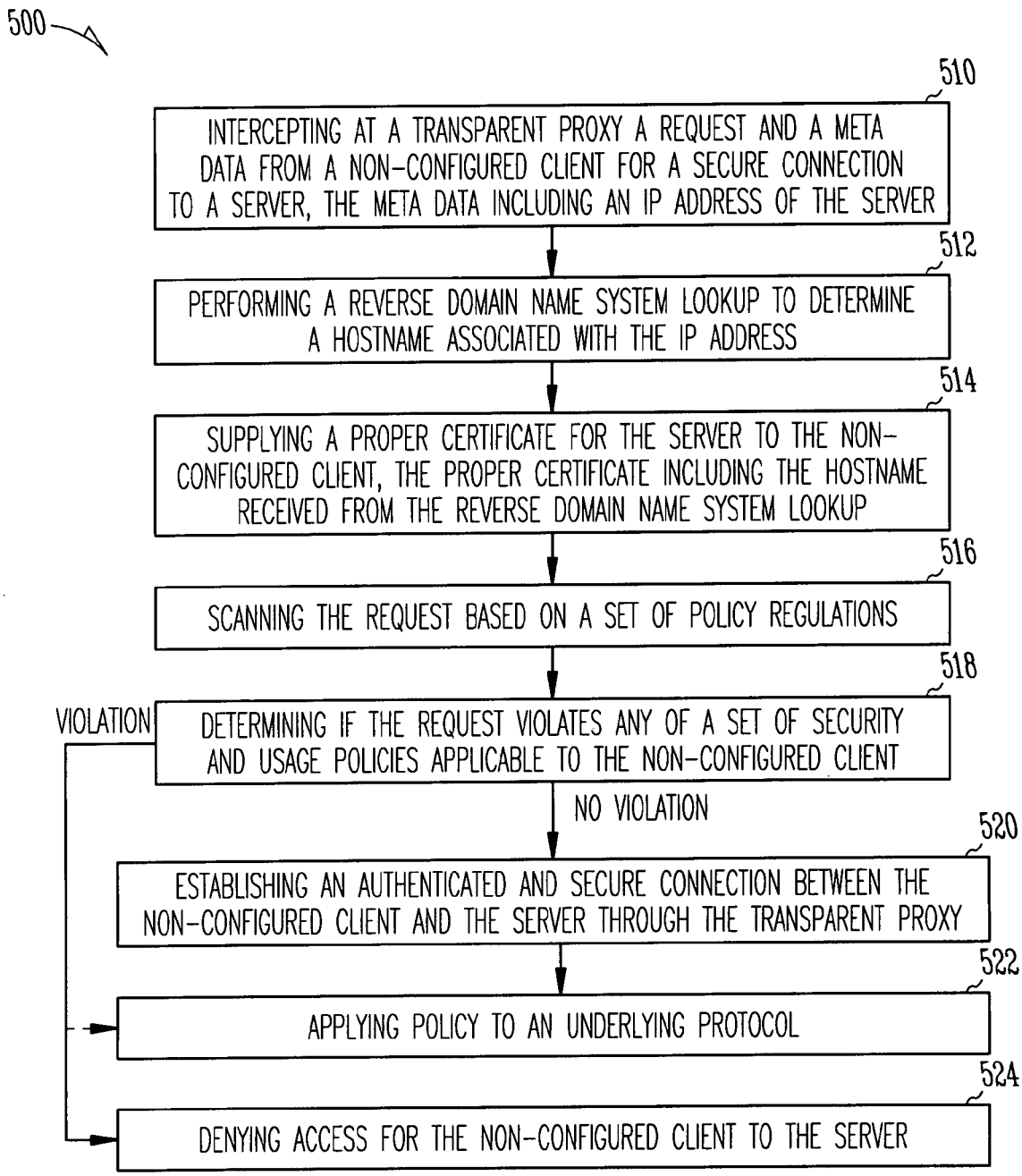
FIG. 5 illustrates a method according to various embodiments.

FIG. 5 illustrates a method 500 according to various embodiments. At block 510 method 500 includes intercepting at a transparent proxy a request and a meta data from a non-configured client for a secure connection to a server, the meta data including an IP address of the server. At block 512 method 500 includes performing a reverse domain name system lookup to determine a hostname associated with the IP address. At block 514 method 500 includes supplying a proper certificate for the server to the non-configured client, the proper certificate including the hostname retrieved from the reverse domain name system lookup.

At block 516 method 500 includes scanning the request based on a set of policy regulations. At block 518 method 500 includes determining if the request violates any of a set of security and usage policies applicable to the non-configured client.

If no violation exists, method 500 proceeds to block 520, including establishing an authenticated and secure connection between the non-configured client and the server through the transparent proxy. At block 521 method 500 includes applying a policy to an underlying protocol. In various embodiments, applying the policy includes applying a part of the policy to an encapsulated protocol, and applying a different part of the policy to an SSL or TLS connection. In various embodiments, the part of the policy applied to the SSL or TLS connection is used to determine if the encryption is strong enough. In various embodiments, the part of the policy applied to the SSL or TLS connection is used to determine if the server certificate is a authenticated and correct certificate. In various embodiments, the part of the policy applied to the encapsulated protocol includes AV scanning and reporting.

If a violation exists, method 500 proceeds to block 522, including denying access for the non-configured client to the server. In various embodiments, denying access includes completing the SSL handshaking messages between the transparent proxy and the client in order to not cause a SSL handshaking message error to be generated at the client, and to send notification adapted to the underlying protocol about the policy violation.

Embodiments may include various combinations of methods 300, 400 and 500. Various embodiments include receiving at a transparent proxy a request from a non-configured client for a network resource located on a server, determining whether the request includes a transport layer security extension having an server name indication extension. If a server name indication extension is included in the request, obtaining a server certificate from a server indicated by the request name indication and supplying to the non-configured client a proper certificate including the server name indication extension as the common name. If a server name indication extension is not included in the request, various embodiments include establishing a connection between the transparent proxy and the server, obtaining a server certificate from the server, and returning to the non-configured client a proper certificate including the server name copied from the server certificate. In the alternative, if a server name indication extension is not included in the request, various embodiments include performing a reverse domain name system lookup to determine a hostname associated with the IP address supplying a proper certificate for the server to the non-configured client, the proper certificate including the hostname.

Various embodiments of systems, apparatus, and methods for providing secure connections between clients, including non-configured clients, and one or more resources, such as but not limited to servers, have been described. The secure connections are provided through a transparent proxy while applying a set of security and usage policies to the requests made by the clients and without generating mismatch errors at the clients, the mismatch errors related to the certificates supplied in response to the requests by the clients for secured connections to resources.

Various embodiment include an apparatus comprising a transparent proxy coupled to a plurality of non-configured clients and coupled to one or more servers, the transparent proxy operable to intercept a request for a secured connection to a first server of the one or more servers, the request from a first non-configured client of the plurality of non-configured clients and including a server name indication extension, and to supply a proper certificate to the first non-configured client including the server name indication extension as a common name in the proper certificate.

Various embodiments include an apparatus comprising a transparent proxy coupled to a plurality of non-configured clients and coupled to one or more servers, the transparent proxy operable to intercept a request for a secured connection to a first server of the one or more servers, the request from a first non-configured client of the plurality of non-configured clients and including a meta data including an internet protocol address, the transparent proxy operable to establish a connection between the transparent proxy and the first server, and to supply a proper certificate to the first non-configured client including the common name extracted from the certificate of the first server.

Various embodiments include an apparatus comprising a transparent proxy coupled to a plurality of non-configured clients and coupled to one or more servers, the transparent proxy operable to intercept a request for a secured connection to a first server of the one or more servers, the request from a first non-configured client of the plurality of non-configured clients and including a internet protocol address, to establish a connection between the transparent proxy and the reverse domain name system to lookup a host name associated with the internet protocol address, and to supply a proper certificate to the first non-configured client including the host name for the first server received from the reverse domain name system.

In the above discussion, the term "computer" is defined to include any digital or analog data processing unit. Examples include any personal computer, workstation, set top box, mainframe, server, supercomputer, laptop or personal digital assistant capable of embodying the inventions described herein.

In various embodiments, the one or more embodiments of the methods described herein are stored as a set of instructions on a computer readable media. Examples of articles comprising computer readable media are floppy disks, hard drives, CD-ROM or DVD media, or any other read-write or read-only memory device, including flash memory devices.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. An apparatus, comprising:
    a first network interface operable to connect to at least one non-configured client;
    a second network interface operable to connect to at least one network resource; and
    a transparent proxy module executing on one or more hardware processors, the one or more hardware processors comprising a part of a computerized system and operable to intercept a request for a secured connection from a first non-configured client of the at least one non-configured clients to a first network resource of the at least one network resources, and to provide a proxy connection between the first non-configured client and the first network resource by establishing a secure encrypted connection to the first non-configured client and establishing a secure encrypted connection to the first network resource such that data may be securely passed between the first non-configured client and the first network resource;
    the transparent proxy module further operable to provide a proper secure connection certificate to the first non-configured client by determining a common name of the first network resource and providing the common name of the first network resource in a certificate used to establish a secure encrypted connection to the first non-configured client such that the first non-configured client recognizes the common name in the certificate as associated with the first network resource;
    a policy module operable to determine whether a connection from the first non-configured client to the first network resource violates a security and usage policy;
    the transparent proxy module further operable to provide a proper certificate even when the intercepted request violates the security and usage policy; and
    the transparent proxy module further operable to selectively provide a proxy connection between only those non-configured clients and network resources that do not violate a security and usage policy.

2. The apparatus of claim 1, wherein the transparent proxy module is further operable to extract the common name of the first network resource from a server name indication extension in a message from the first non-configured client, and to include the extracted common name in the certificate returned to the first non-configured client.

3. The apparatus of claim 2, wherein the transparent proxy module is further operable to determine that the common name of the first network resource is not provided in a server name indication extension, and use an IP address of the first network resource to determine the common name for the resource.

4. The apparatus of claim 3, wherein using an IP address of the first network resource to determine the common name for the resource comprises performing a reverse domain name system lookup of the IP address of the first network resource to obtain the common name for the first network resource.

5. The apparatus of claim 1, wherein the first network resource comprises a server.

6. A method, comprising:
    intercepting a request for a secured connection from a first non-configured client of at least one non-configured clients to a first network resource of at least one network resources;
    determining whether a connection from the first non-configured client to the first network resource violates a security and usage policy;
    providing a proper secure connection certificate to the first client by determining a common name of the first network resource and providing the common name of the first network resource in a certificate used to establish a secure encrypted connection to the first non-configured client such that the first non-configured client recognizes the common name in the certificate as associated with the first network resource; and
    providing a proxy connection between the first non-configured client and the first network resource by establishing a secure encrypted connection to the first non-configured client and establishing a secure encrypted connection to the first network resource such that data may be securely passed between the first non-configured client and the first network resource; wherein a proper certificate is provided even when the intercepted request violates the security and usage policy and the proxy connection is established only for requests that do not violate;
    wherein at least one of the intercepting a request, providing a proper secure connection certificate, and providing a proxy connection is performed via one or more processes executing on one or more hardware processors, the one or more hardware processors comprising part of one or more computerized systems communicatively coupled via a communication network, and
    extracting the common name of the first network resource from a security certificate obtained from the first network resource.

7. The method of claim 6, further comprising:
    extracting the common name of the first network resource from a server name indication extension in a message from the first non-configured client; and including the extracted common name in the certificate returned to the first non-configured client.

8. The method of claim 7, further comprising:
    determining that the common name of the first network resource is not provided in a server name indication extension; and
    determining the common name for the first network resource using an IP address of the first network resource.

9. The method of claim 8, wherein using an IP address of the first network resource to determine the common name for the first network resource comprises performing a reverse domain name system lookup of the IP address of the first network resource to obtain the common name for the first network resource.

10. The method of claim 6, wherein the first network resource comprises a server.

11. A non-transitory machine-readable medium with instructions stored thereon, the instructions when executed operable to cause one or more processors of a computerized system to:
    intercept a request for a secured connection from a first non-configured client of at least one non-configured clients to a first network resource of at least one network resources;

determine whether a connection from the first non-configured client to the first network resource violates a security and usage policy;

provide a proper secure connection certificate to the first non-configured client by determining a common name of the first network resource and providing the common name of the first network resource in a certificate used to establish a secure encrypted connection to the first non-configured client such that the first non-configured client recognizes the common name in the certificate as associated with the first network resource; and provide a proxy connection between the first non-configured client and the first network resource by establishing a secure encrypted connection to the first non-configured client and establishing a secure encrypted connection to the first network resource such that data may be securely passed between the first non-configured client and the first network resource; wherein a proper certificate is provided even when the intercepted request violates the security and usage policy and the proxy connection is established only for requests that do not violate, and to extract the common name of the first network resource from a security certificate obtained from the first network resource.

12. The machine-readable medium of claim 11, further comprising instructions to cause the one or more processors to: extract the common name of the first network resource from a server name indication extension in a message from the first non-configured client; and include the extracted common name in the certificate returned to the first non-configured client.

13. The machine-readable medium of claim 11, further comprising instructions to cause the one or more processors to:

determine that the common name of the first network resource is not provided in a server name indication extension; and determine the common name for the first network resource using an IP address of the first network resource.

14. The machine-readable medium of claim 11, wherein using an IP address of the first network resource to determine the common name for the resource comprises performing a reverse domain name system lookup of the IP address of the first network resource to obtain the common name for the first network resource.

* * * * *

UNITED STATES PATENT AND TRADEMARK OFFICE
CERTIFICATE OF CORRECTION

| | | |
|---|---|---|
| PATENT NO. | : 8,549,157 B2 | Page 1 of 1 |
| APPLICATION NO. | : 11/738834 | |
| DATED | : October 1, 2013 | |
| INVENTOR(S) | : Jan F. Schnellbaecher | |

It is certified that error appears in the above-identified patent and that said Letters Patent is hereby corrected as shown below:

In the drawings

On sheet 1 of 5, in Figure 1, Reference Numeral 150, line 1, delete "RESCOURCE" and insert -- RESOURCE --, therefor.

On sheet 1 of 5, in Figure 1, Reference Numeral 152, line 1, delete "RESCOURCE" and insert -- RESOURCE --, therefor.

On sheet 1 of 5, in Figure 1, Reference Numeral 156, line 1, delete "RESCOURCE" and insert -- RESOURCE --, therefor.

In the claims

In column 13, line 47, in claim 1, delete "policy." and insert -- policy, wherein the transparent proxy module is further operable to extract the common name of the first network resource from a security certificate obtained from the first network resource. --, therefor.

Signed and Sealed this
Eighteenth Day of February, 2014

Michelle K. Lee
*Deputy Director of the United States Patent and Trademark Office*